(12) United States Patent
Al Shammary

(10) Patent No.: US 9,447,889 B2
(45) Date of Patent: *Sep. 20, 2016

(54) BLOCKED VALVE ISOLATION TOOL

(71) Applicant: Saudi Arabian Oil Company, Dhahran (SA)

(72) Inventor: Mohammad Ahmed Al Shammary, Jubail (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,641

(22) Filed: Aug. 11, 2014

(65) Prior Publication Data

US 2014/0366976 A1 Dec. 18, 2014

Related U.S. Application Data

(63) Continuation-in-part of application No. 13/693,129, filed on Dec. 4, 2012, now Pat. No. 8,800,602.

(60) Provisional application No. 61/567,387, filed on Dec. 6, 2011.

(51) Int. Cl.
| | |
|---|---|
| *F16L 55/12* | (2006.01) |
| *F16K 7/10* | (2006.01) |
| *F16L 55/134* | (2006.01) |
| *F16L 55/124* | (2006.01) |

(52) U.S. Cl.
CPC ............... *F16K 7/10* (2013.01); *F16L 55/124* (2013.01); *F16L 55/134* (2013.01); *Y10T 137/0486* (2015.04)

(58) Field of Classification Search
CPC ........ F16L 55/124; F16L 55/134; F16K 7/10

USPC ............ 138/93, 94, 94.5; 137/315.06, 15.15, 137/15.17, 15.18, 315.01
See application file for complete search history.

(56) References Cited

U.S. PATENT DOCUMENTS

| | | | | |
|---|---|---|---|---|
| 1,510,212 A | * | 9/1924 | Du Bois | 15/104.31 |
| 1,860,855 A | * | 5/1932 | Gardner | 138/93 |

(Continued)

FOREIGN PATENT DOCUMENTS

| | | |
|---|---|---|
| DE | 4105446 A1 | 8/1991 |
| EP | 0989344 A1 | 3/2000 |

OTHER PUBLICATIONS

International Preliminary Report on Patentability for PCT/US2012/067676, dated Jun. 10, 2014, 10 pages.

*Primary Examiner* — Patrick F Brinson
(74) *Attorney, Agent, or Firm* — Abelman, Frayne & Schwab

(57) ABSTRACT

A valve isolation tool for insertion through a vent duct and vent duct valve of a gas flow duct. The isolation tool includes an outer tube having proximal and distal ends, the outer tube having a diameter sized to extend through the vent duct and blocking valve. An inner tube having proximal and distal ends is arranged coaxially with and movable within the outer tube. An inflatable balloon is attached to the distal end of the inner tube, wherein the isolation tool outer tube is insertable through the vent duct to an opening in the gas flow duct. The inner tube is slidably insertable through the outer tube until the balloon is situated within a bore formed through the gas flow duct and is inflatable therein to block any gas leak through the gas flow duct.

13 Claims, 9 Drawing Sheets

(56) References Cited

U.S. PATENT DOCUMENTS

Figure 1:
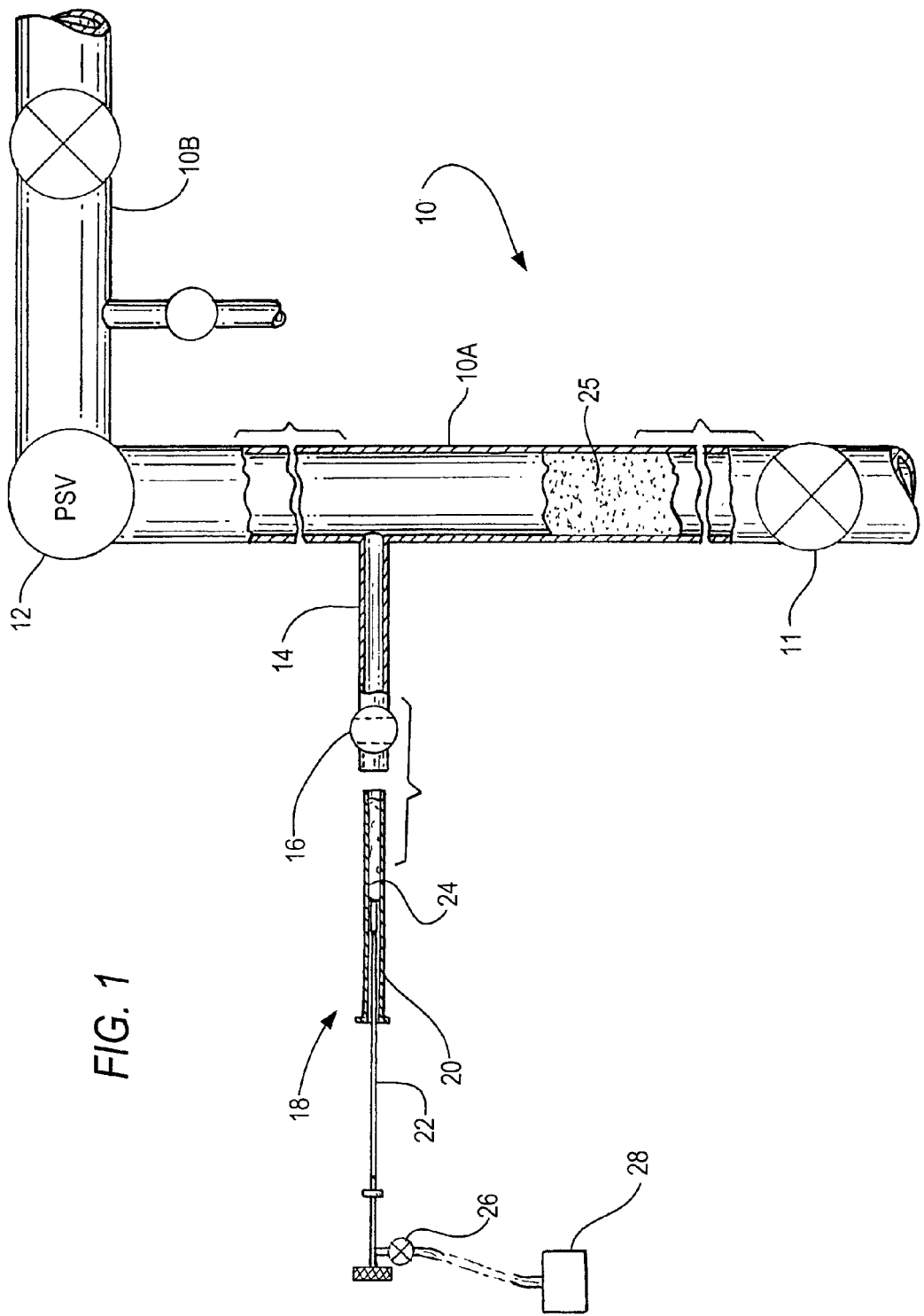

| | | | |
|---|---|---|---|
| 1,946,138 A * | 2/1934 | Gardner | 138/93 |
| 3,842,864 A * | 10/1974 | Riegel et al. | 138/93 |
| 5,524,661 A * | 6/1996 | Tigerholm | 137/15.15 |
| 6,263,896 B1 * | 7/2001 | Williams | 137/15.15 |
| 6,588,455 B1 * | 7/2003 | Welfare | 138/94.5 |
| 7,520,301 B2 * | 4/2009 | Ord et al. | 138/93 |
| 8,800,602 B2 | 8/2014 | Al Shammary | |
| 2001/0047825 A1 * | 12/2001 | Williams | 137/315.06 |
| 2010/0012199 A1 * | 1/2010 | Mainzer | 137/318 |

* cited by examiner

BLOCKED VALVE ISOLATION TOOL

I. CROSS-REFERENCE TO RELATED APPLICATION

This patent application claims the benefit of U.S. Provisional Application No. 61/567,387, filed Dec. 6, 2011, now U.S. Ser. No. 13/693,129 filed Dec. 4, 2012 the content of which is incorporated by reference herein in its entirety.

II. FIELD OF THE INVENTION

This invention is in the field of gas treatment and production facilities, and particularly procedures employed in a portion of a gas flow duct system for isolation and removal of a valve for inspection, repair or replacement.

III. BACKGROUND OF THE INVENTION AND PRIOR ART

In facilities for processing, storing and distributing gaseous products there are numerous relief valves for monitoring, controlling and relieving pressure build-up of gas flowing in duct systems. From time to time such relief valves need to be inspected and removed and replaced. Removal of a valve may expose the system to inconvenient or dangerous leakage of gas from the duct upstream of the removed valve particularly where a blocking valve does not achieve 100% shut-off. A common but usually inconvenient and expensive solution to this leakage problem is to shut down the parent system or at least to shut down the subsystem in the immediate vicinity of the relief valve to be removed. In a large gas treatment or production plant there are a great many such relief valves that need periodic attention as described above, or need removal in emergency situations, costing substantial downtime and expense. The present invention provides a solution that is reliable, substantially less expensive and more practical than conventional practice in gas collection, compression, treatment, distribution and/or storage facilities.

IV. SUMMARY AND OBJECTS OF THE INVENTION

A first object of this invention is to provide a method and apparatus to remove a relief valve from a gas flow duct system or to isolate said valve for inspection with reduced interruption of production and preferably without shutdown of the system. This new method and apparatus may be applicable to isolate any valve or component in a gas flow duct system.

A further object is to provide a method and apparatus for temporarily blocking gas flow in a duct by inserting an element that is inflatable to close the passageway in the bore of the duct, and particularly to blocking potential or actual leaking of gas from block valves upstream and/or downstream of an area of interest of a gas flow duct.

A still further object is to provide a method and apparatus using an inflatable balloon to temporarily seal a duct from a gas leak from an upstream valve. Another object is to provide a method and apparatus of inserting and inflating a balloon in a gas flow duct adjacent a block valve upstream and/or downstream of an area of a relief valve being inspected, repaired and/or replaced.

An additional object in a duct system having spaced apart upstream and downstream portions separated by a relief valve, is to provide a method and apparatus for inspection, repair and/or removal and replacement of said relief valve by removably inserting in said duct an un-inflated sealing balloon upstream of said relief valve and inflating said balloon to block gas flow in said duct's bore to allow attention to said relief valve downstream of said inflated balloon and to similarly insert a sealing balloon downstream of said relief valve.

Another object is to provide an apparatus and method for sealing a gas flow duct upstream of a valve to be inspected, repaired and/or replaced, including providing a vent opening in a wall of said duct, providing a balloon delivery device that inserts a collapsed balloon through said vent opening into the bore of said duct, inflating said balloon to block gas flow in said bore to allow attention to said valve, and collapsing and removing said balloon after replacement of said valve.

One embodiment of the method herein may be described as a method for isolating a relief valve between upstream and downstream segments of a gas flow duct system and temporarily blocking gas flow from said upstream segment, to allow removal and replacement of said relief valve, the method operable with a source of high pressure gas for inflating a balloon, comprising the steps:

a. providing a tubular isolation tool with an un-inflated balloon in its distal end,
b. providing a vent tube communicating into said upstream duct segment (downstream of said blocking valve),
c. providing in said vent tube a blocking valve which is openable to allow insertion of said tubular isolation tool,
d. through said vent tube inserting said isolation tool until said balloon at its distal end is extended into the bore of said upstream duct segment,
e. from said high pressure source of gas, inflating said balloon until it fills said bore of said upstream duct segment and blocks downstream gas flow in said duct segment,
f. removing said relief valve (for inspection and any necessary adjustment or repair),
g. reinstalling an approved relief valve, and
h. deflating and removing said balloon.

In the method described above the isolation tool comprises a hollow tube having open proximal and distal ends, said proximal end is connectable to a source of high pressure air for inflating said balloon.

In the method described above the isolation tool comprises an outer tube that is insertable axially through said vent tube, and an inner tube having proximal and distal ends, with said balloon attached to said distal end of said inner tube, said inner tube being insertable through said outer tube until said distal end thereof and balloon are positioned within the bore of said upstream duct segment.

One embodiment of the invention herein is further defined as a leaking block valve isolation tool, comprising:

a. an outer tube having proximal and distal ends,
b. an inner tube having proximal and distal ends, and axially movable within said outer tube, and
c. an inflatable balloon attached to said distal end of said inner tube, where said isolation tool outer tube is insertable through a vent duct to an opening in a gas flow duct, and said inner tube is insertable through said outer tube until said balloon is situated within the bore of said gas flow duct and is inflatable therein to block any gas leak through said gas flow duct.

A further embodiment of the isolation tool described above, includes a cover to block gas leakage from the vent duct through which the isolation tool is introduced until its balloon is positioned in the gas duct, the cover comprising an elongate elastic hood that encompasses the isolation tool including the junction where it enters the vent duct leading to the leaking gas duct.

Another isolation tool used for the purpose described above, has the additional feature of a device at its distal end for automatic deflection of the inflatable balloon in the direction toward a valve being blocked as the balloon is inserted into the gas flow duct. In one embodiment this device is a resilient spring element having a first part fixed at or near the distal end of the inner tube where the balloon is attached, and a second part biased when not restrained to push the balloon in said direction of the valve being blocked.

In one embodiment of the automatic deflection device said first part is a collar extending around and fixed to said distal end of the inner tube and said second part is a finger or flap extending axially from the first part with a hinge area between said first and second parts, the second part being spring biased to deflect from axial to push the balloon in a direction inclined from the axis of the inner tube.

In one inner tube, deflection device and balloon sub combination the balloon has a proximal end collar that slides on to the distal end of the inner tube, with a distally extending portion of the collar being engageable and pushed by the deflection device.

In an alternate version the collar may be less stiff, weaker, softer or thinner on the side wall were deflection is desired, so that upon inflation it naturally inclines in the direction of the weaker balloon material and toward the valve being blocked. Still other devices or techniques may be employed to deflect or otherwise urge the balloon in a particular direction. Deflection devices as described above must be carried or transported by the distal part of the inner tube, and must be small enough to not interfere with axial passage of the inner tube and balloon through the outer tube.

In a further vent duct and isolation tool combination, the vent duct has a cover-receiving portion of predetermined length extending from the side of the vent duct valve in the proximal direction away from the main gas pipe. The new cover has its distal end slid over and encompassing this cover-receiving portion of the rent duct, and further secured thereon by belts, straps, bands, tape or other securing means.

The proximal end of the cover is sealingly secured about the proximal end of the inner tube, which automatically also encompasses the proximal end of the outer tube. Thus, when the vent duct valve is open, and he guess leakage from the main pipe, through said valve and into, through and/or around the outer tube, is captured within the cover. In an alternate version the proximal end of the cover may engage the proximal part of the inner tube in a ceiling but slidable coupling instead of being fixed thereon.

The present invention also includes a method for employing apparatus of the type described above. The inner tube with the inflatable balloon secured at its distal end is inserted into the outer tube, with the cover positioned to encompass the proximal and of the inner and outer tubes and the cover receiving portion of the vent duct. The proximal end of the inner tube is fluid-coupled to a gas supply line from a pressurized gas source for later inflating the balloon. Then vent valve may be opened to allow insertion of the isolation tool into and through the vent valve, axially in the distal direction until the distal end of the inner tube is positioned at the opening in the side wall of the main duct. When the distal end of the inner tube along with the balloon is situated in the main duct, the deflecting device pushes the balloon in the direction of the valve to be blocked, and the valve controlling the compressed gas source is open for flow of gas into the balloon and inflation thereof to fill the main duct and block gas leakage from the valve being blocked.

For further leakage control a second belt or strap is secured around the distal end of the cover, and thereafter the relief valve can be removed and the main pipe sealed until the relief valve is checked, and/or repaired and replaced. After that, the balloon can be depressurized, and the inner tube can be withdrawn dragging the deflated balloon with it through the vent duct valve and through the outer tube. Now the vent duct valve can be closed, the belts removed along with the cover and complete isolation tool apparatus.

V. BRIEF DESCRIPTION OF THE DRAWINGS

Figure 2:
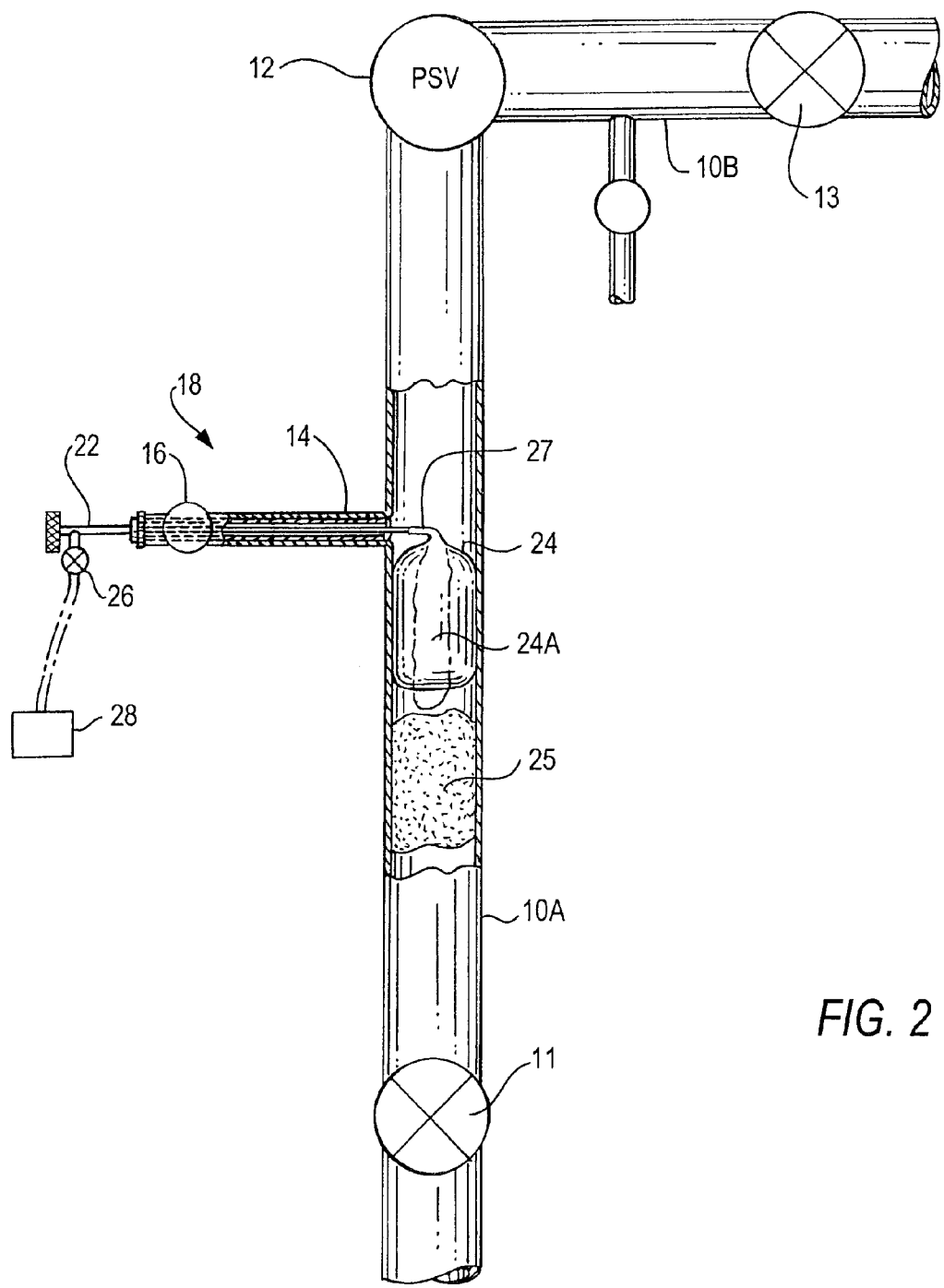
Figure 3:
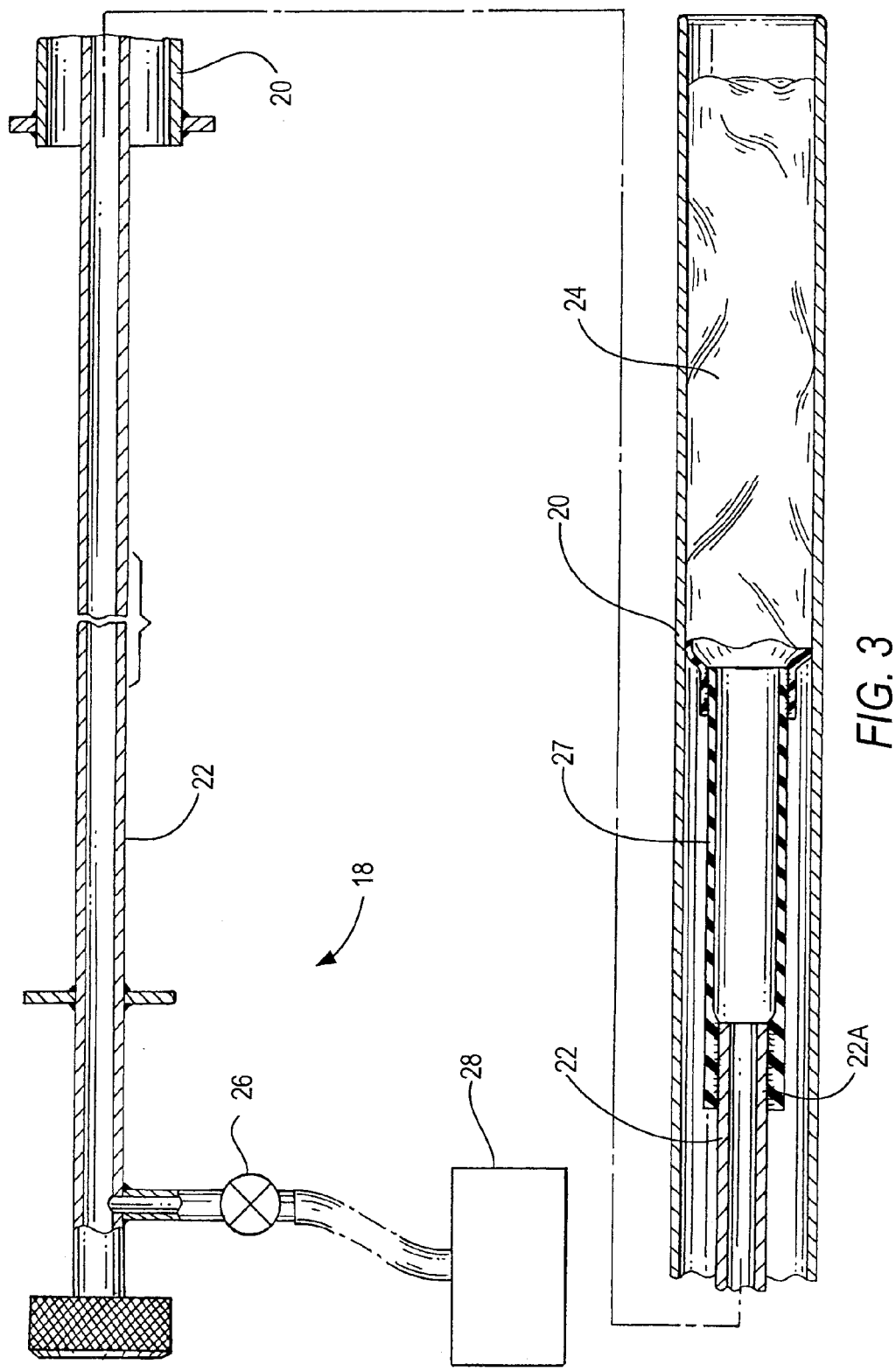
Figure 4:
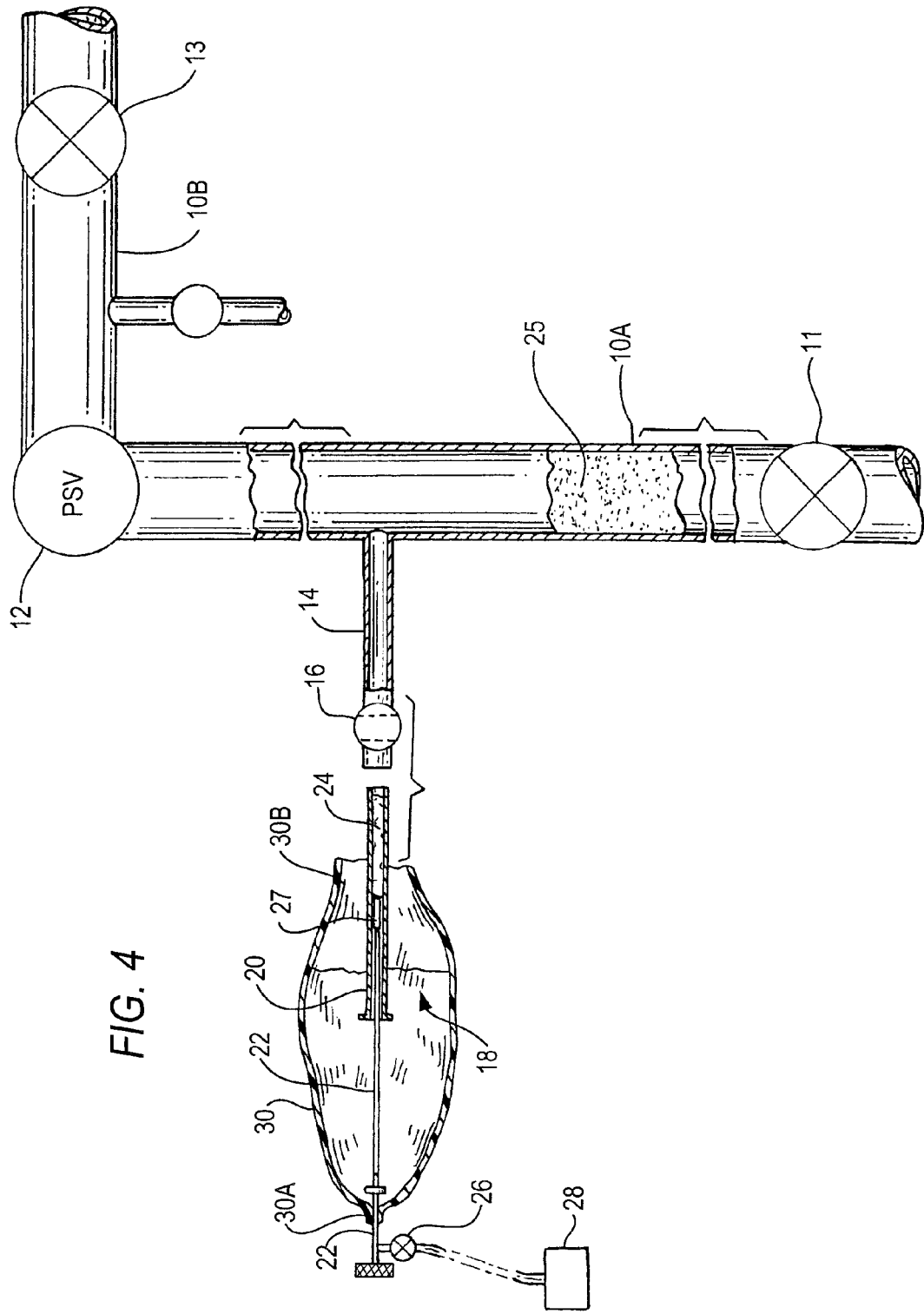
Figure 5:
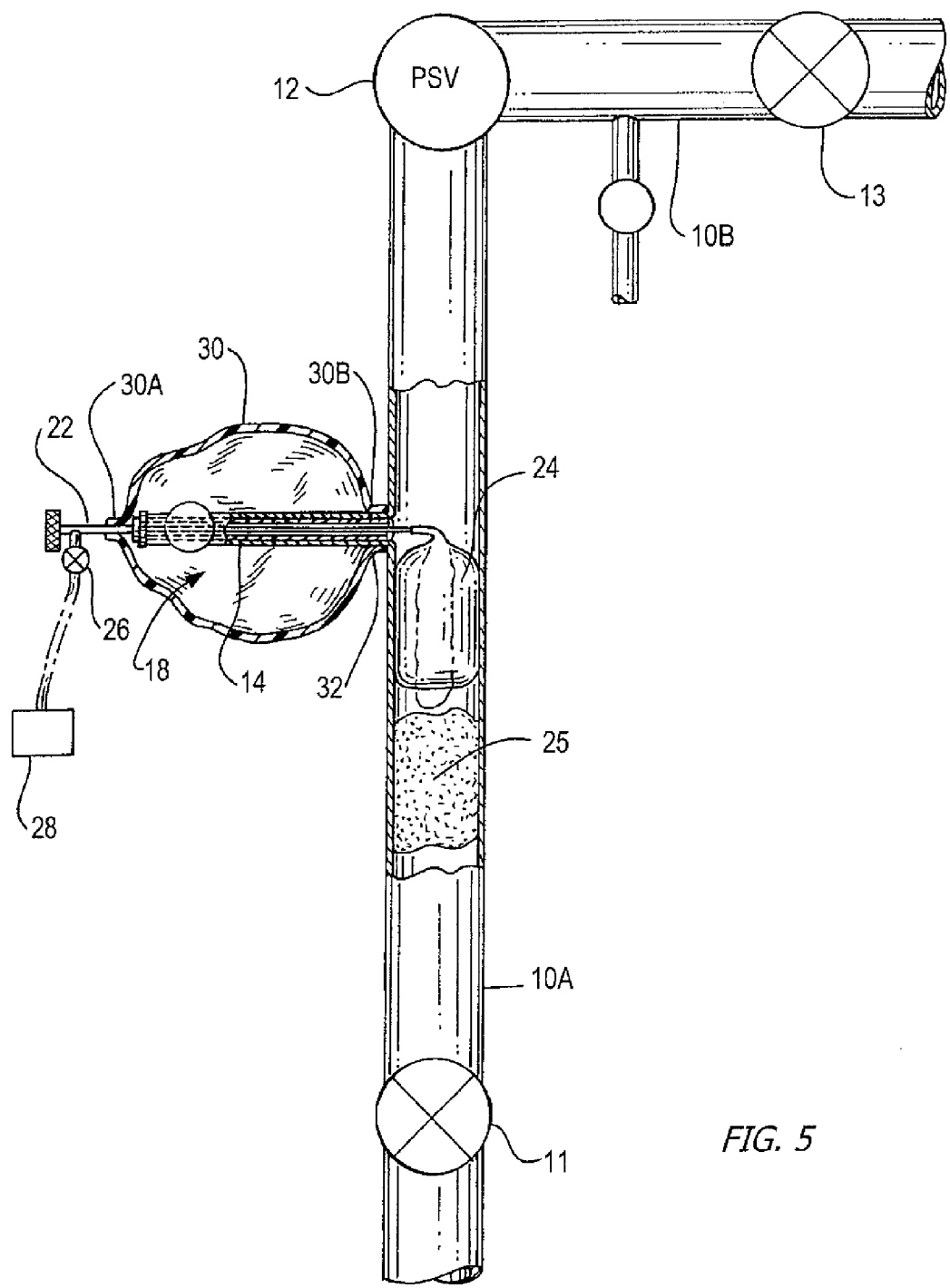
Figure 6:
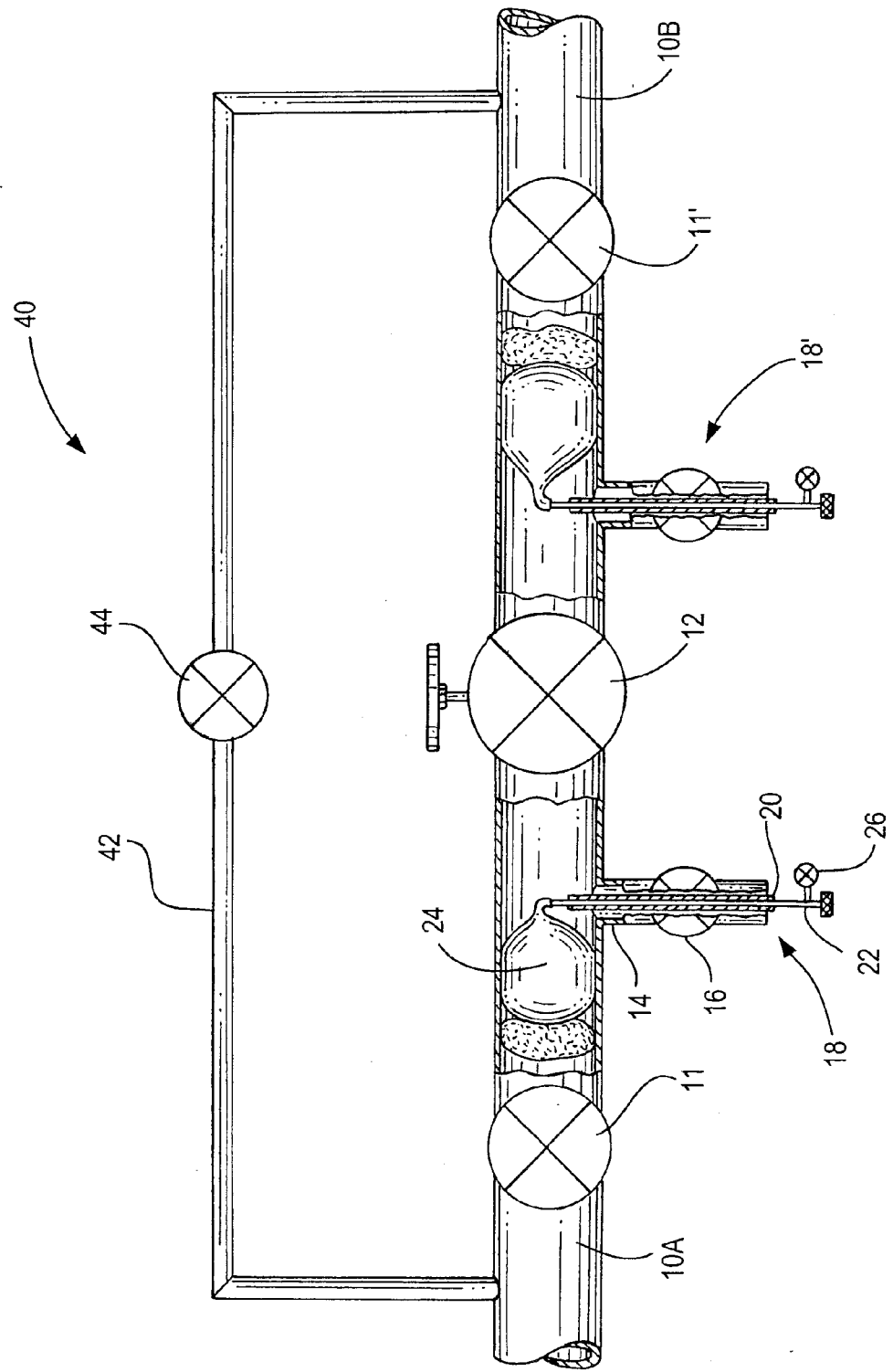
Figure 7:
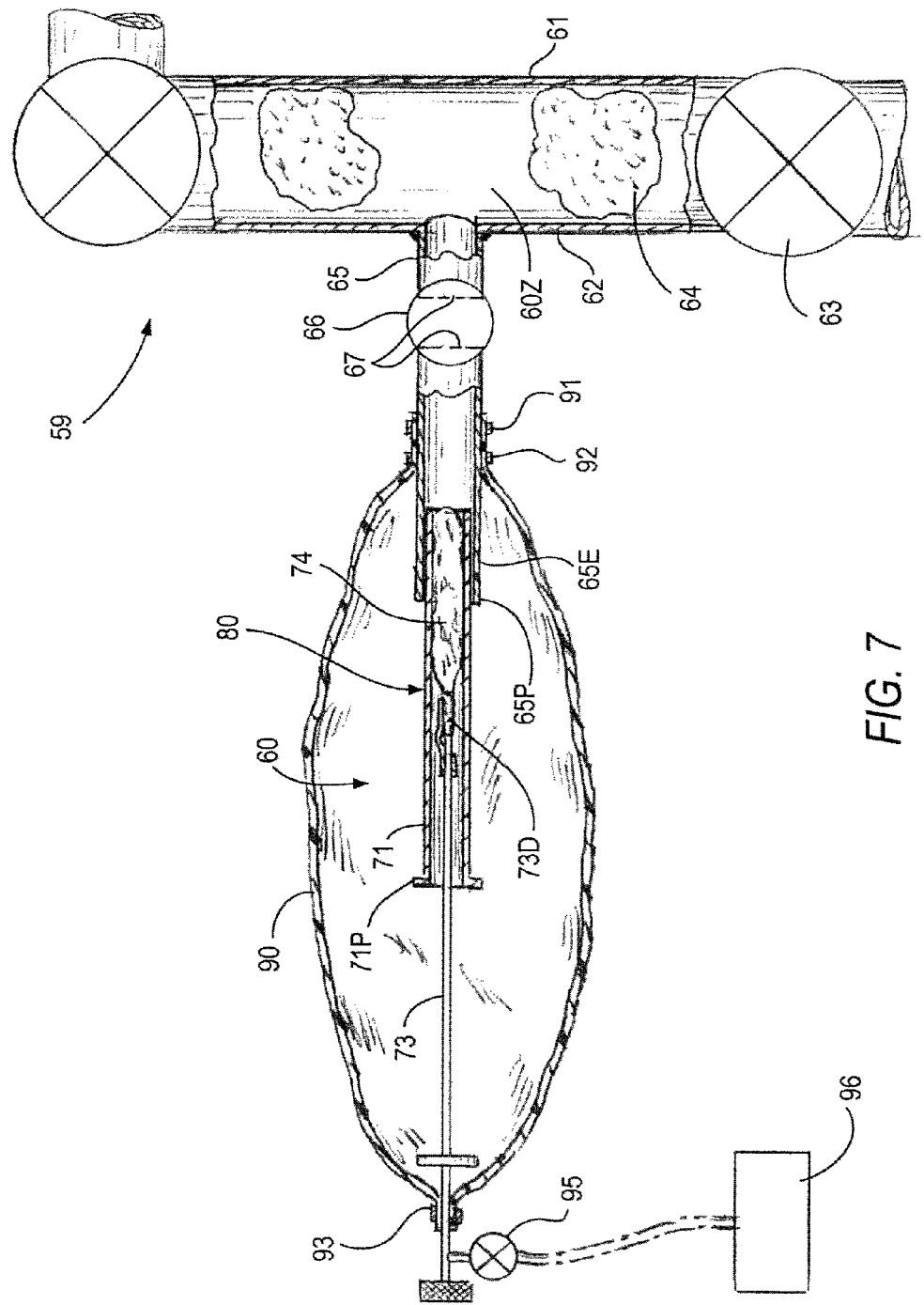
Figure 8A:
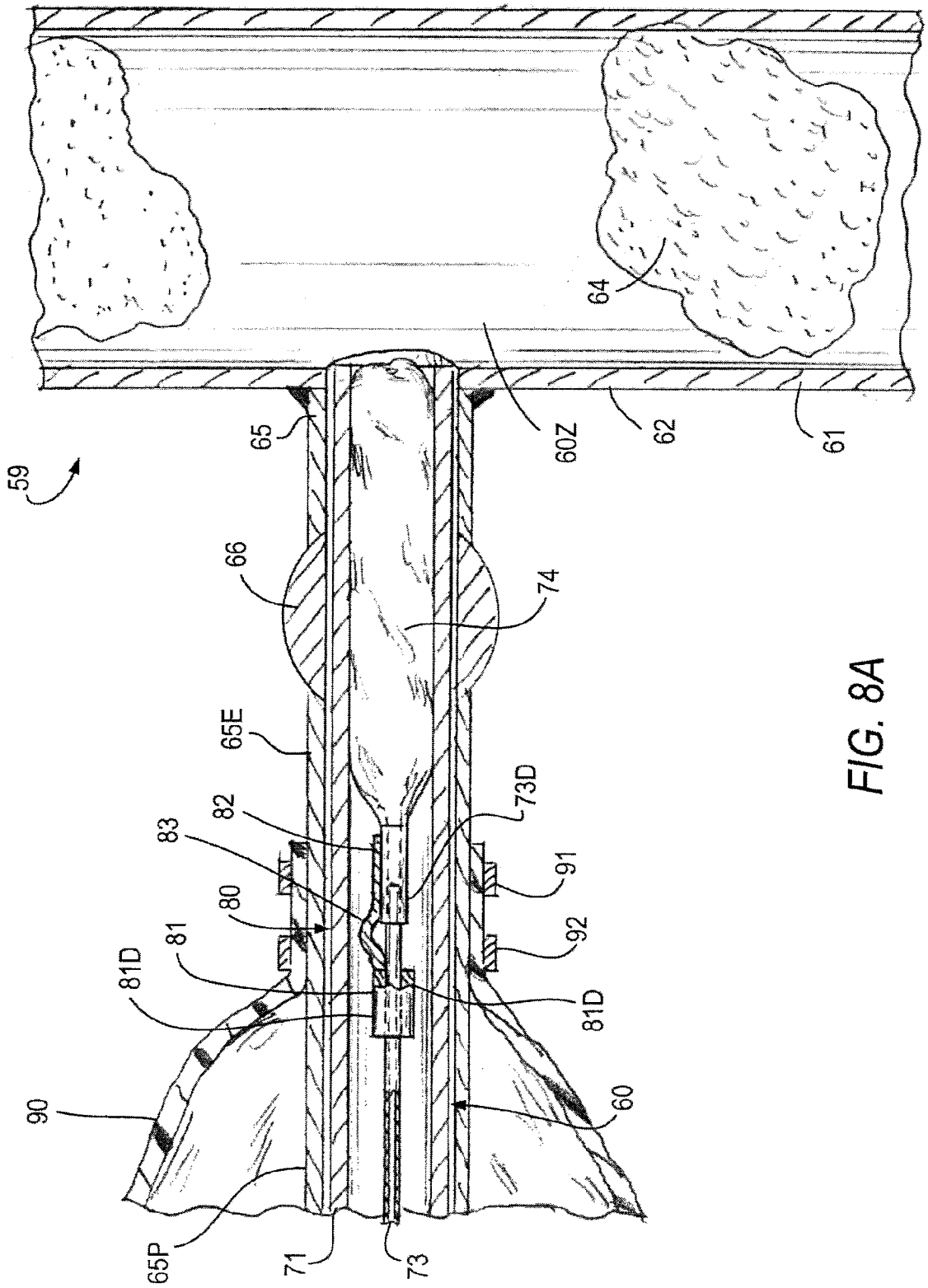
Figure 8B:
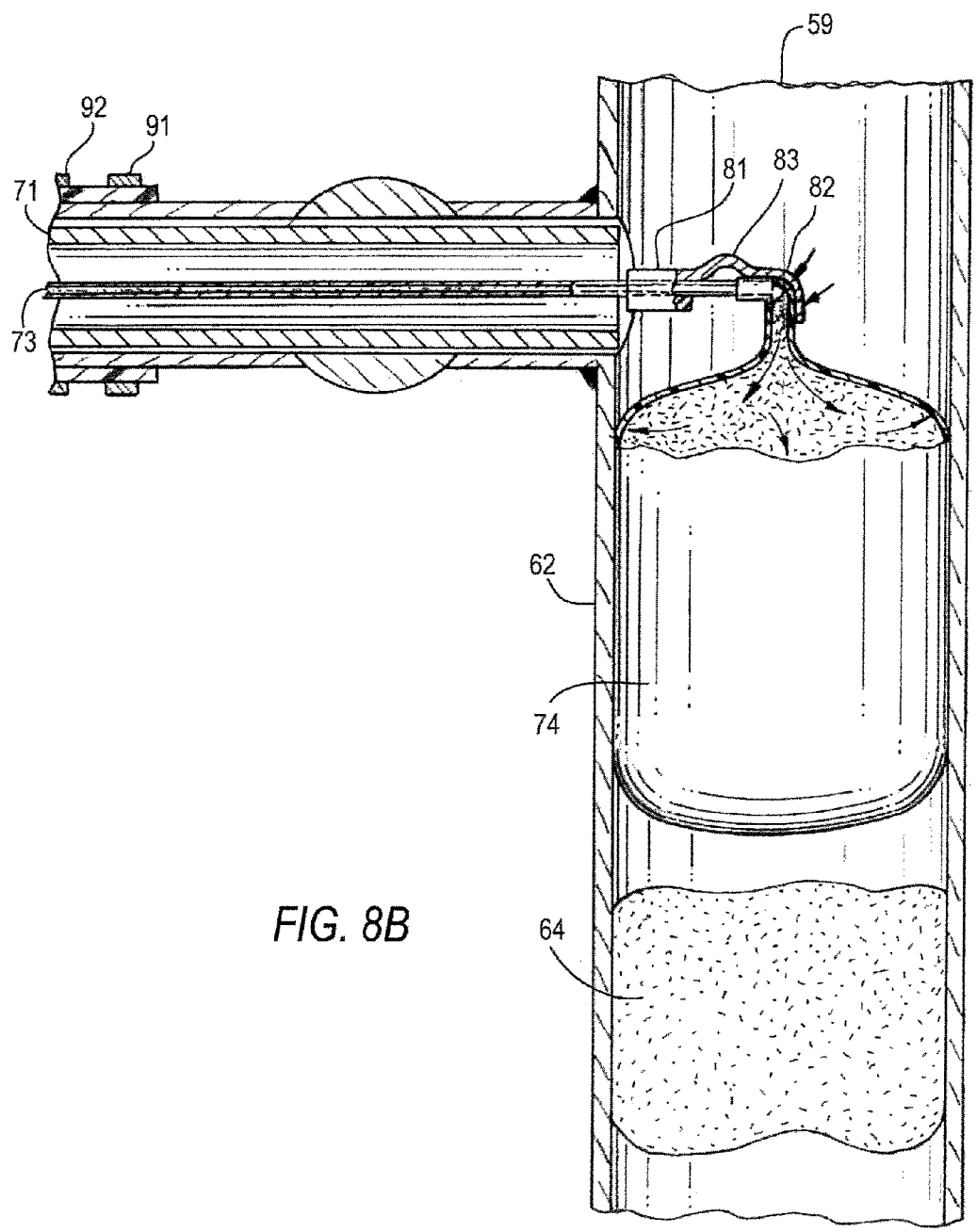

FIG. 1 is a schematic plan view partially in section of a duct system including a relief valve between upstream and downstream blocking valves and the new leaking block valve isolation tool with its balloon not yet inserted or inflated, FIG. 2 is a schematic plan view similar to FIG. 1 showing the balloon in inflated state and sealing the bore of the duct, FIG. 3 is an enlarged schematic plan view in section of the leaking block valve isolation tool with the balloon in collapsed and un-inflated state inside the tubular portion of the tool, FIG. 4 is a schematic plan view similar to FIG. 1 showing a second embodiment with a rubber cover positioned over the proximal end of the leaking block valve isolation tool before it is inserted into the vent duct, FIG. 5 is a schematic plan view similar to FIG. 4 showing the leaking block valve isolation tool fully inserted through the vent duct, and the cover's distal end secured about said vent duct inward of the vent duct's blocking valve, FIG. 6 is a top plan view partially in section of a duct system with a leaking block valve isolation tool installed adjacent both upstream and downstream block valves, FIG. 7 is a fragmentary top plan view partially in section showing the new balloon deflection device and the new gas-sealing cover, FIG. 8A is an enlarged fragmentary top plan view of the distal end of the cover and the deflection device of FIG. 7 prior to its insertion of the balloon into the main gas duct, and FIG. 8B is an enlarged fragmentary top plan view similar to FIG. 8 showing the isolation tool inserted in the distal direction with the balloon positioned and inflated within the main gas duct.

For convenience and clarity similar elements in the different illustrated embodiments in the above referenced figures utilize the same reference numbers.

VI. DETAILED DESCRIPTION OF THE PREFERRED EMBODIMENTS

FIGS. 1 through 3 illustrate a first embodiment of the present invention as a device operable in a duct system through which flows a gas that should be prevented from escaping while a downstream valve is inspected, removed, repaired and/or replaced. The relevant duct system includes an upstream duct 10A, relief valve 12 and further duct 10B downstream of relief valve 12. A gas flows through this duct 10A-10B with relief valve 12 in line to monitor pressure of the gas flow and relieve excessive pressure if such occurs; however, periodically the relief valve needs to be isolated, inspected and as required removed, repaired or replaced and re-installed. A principal object of this invention is to allow an efficient inspection, repair and/or replacement of a relief valve without having to shut down significant portions of the system, particularly the duct 10A-10B where the relief valve is located.

As seen in FIGS. 1 and 2, extending transversely out of duct 10A, is vent duct 14, blocking valve 16 and leaking block valve isolation tool 18. As seen in FIGS. 1-3 new valve isolation tool 18 comprises external tube 20, internal tube 22, and a balloon 24 at the end of the internal tube 22 inside external tube 20. Also there is an air inlet valve 26 to allow air into internal tube 22, through that tube, to eventually inflate balloon 24. FIG. 6 illustrates another preferred embodiment 40 that is similar to the duct system of FIGS. 1 and 2, except that embodiment 40 utilizes leaking block valve isolation tools 18, 18' respectively adjacent block valve 11 in upstream duct 10A and adjacent bock valve 11' in downstream duct 10'. In this duct system including by-pass valve 44, leaking block valve isolation tools 18 and 18' protect the area of relief valve 12 from upstream or down stream gas leaks.

In operation as seen in FIG. 2, valve 16 is opened, external tube 20 of isolation device 18 is inserted through the opening in the valve 16 until the distal end of tube 20 has entered duct 10A which is upstream of the relief valve 12. Then valve 26 is opened and air from high pressure source 28 flows through internal tube 22 and inflates balloon 24 where it is situated in the bore of duct 10A.

Inflation pressure is sufficient to seal balloon 24 against the inner walls of duct 10A and block gas (service fluid of the gas treatment operation) from leaking downstream of valve 11 or into area of relief valve 12. This preferred embodiment inflation pressure is at least 20 pounds per square inch gauge (psig) to be greater than the up to 20 psig in the upstream duct. Then it is safe to remove and replace relief valve 12 without leakage of gas 25. After completion of inspection, removal, repair and/or replacement of valve 12, balloon 24 is deflated, and isolation device 18 is withdrawn back out through valve 16. Valve 16 is then closed.

FIG. 1 illustrates valve 16 in its closed state as indicated by the set of parallel lines extending through valve 16 and transversely of the duct 14 axis. Also, shown in FIG. 1 is the isolation tool positioned to be inserted through valve 16. Balloon 24 is attached to the distal end of inner tube 22.

FIG. 2 illustrates isolation tool 18 fully inserted through now-open valve 16 (as seen by the set of parallel lines extending axially through valve 16) and through duct 14 with the distal end of inner tube 22 situated within the bore of duct 10A, and with balloon 24 fully inflated and blocking the bore of duct 10A from gas flow indicated by reference 25 toward relief valve 12.

FIG. 3, an enlarged view of isolation tool 18, shows collar 27 that may be formed of plastic that couples balloon 24 to distal end 22A of inner tube 22. This collar facilitates the balloon, when inserted in the bore of duct 10A, to drop into the position shown in FIG. 2 and seal against the wall surfaces of the bore.

Also shown in FIGS. 1-3 is the balloon inflation means comprising a source of compressed air 28 and valve 26 to allow air flow from compressed air source 28 through inner tube 22 to balloon 24 after it is inserted into the bore of duct 10A.

In this preferred embodiment inner tube 22 has ¼ inch I.D., outer tube 20 has ½ inch O.D., and balloon 24 is inflated to at least 20 psig, in a duct system where the gas leak pressure is less than 20 psig the compressed air source 28 may be a compressor, storage tank or other apparatus.

When desired to deflate and retract balloon 24, air in the balloon can be allowed to escape or can be sucked out by means not shown.

In the duct system of FIGS. 1 and 2, duct 10A has upstream blocking valve 11 which can be closed, but if it leaks balloon 24 of isolation tool 18 will provide sufficient blockage of gas leaking downstream toward valve 12 or through vent duct 14.

FIGS. 4 and 5 illustrate a second embodiment of the new invention which has the features of the embodiment of FIGS. 1-3 plus a rubber cover 30 designed to create a gas seal about valve isolation tool 18, so that gas which leaks or flows through blocking valve 11 cannot escape out through duct 14 and/or through valve 16 or other parts of isolation tool 18.

FIG. 4 shows cover 30 as a balloon-like element encompassing the proximal part of isolation tool 18, with the cover's proximal end 30A secured about the near end of inner tube 22 and its distal end 30B (shown stretched open for clarification) encompassing part of outer tube 20. FIG. 5 shows isolation tool 18 fully inserted through duct 14, and the distal end 30B of cover 30 secured about the near end of duct 14. FIG. 5 illustrates how cover 30 blocks escape of any gas that flows or leaks past valve 11 into duct 14, or flows upstream from relief valve 12 and into and through duct 14 and into components of isolation tool 18. The cover's distal end 30B would preferably be secured to duct 14 before valve 16 is opened and thus before insertion of isolation tool 18 into duct 14.

If the first embodiment disclosed in FIGS. 1-3 is employed without cover 30 of the second embodiment shown in FIGS. 4 and 5, there is some risk of gas escaping through vent duct 14 when insertion tool 18 is inserted. In such event the operator should position himself up-wind of the open vent valve 16.

The present invention allows a pressure relief valve or other valve or duct component to be isolated for inspection, testing, removal, repair and/or replacement, in as little as 15-30 minutes without interruption or shutdown of the relevant duct system. Prior art procedures for the same result typically take several days and since it is common in large gas production, treatment, storage and distribution facilities to require a great many of these procedures to cut the gas flow and purge the line where the inspection or incident will occur. The present invention will allow greatly reduced downtime of the facility, and thus will allow significant reduction of cost and inconvenience.

FIGS. 7, 8A and 8B illustrate for a gas duct system 59 another isolation valve tool 60 (also designated IVT herein for convenience) used for the purpose described above. Duct system 59 as illustrated in these fragmentary views, includes gas duct 61, duct segment 62 and valve 63 to be blocked in regard to gas 64 leaking from valve 63. Extending transversely from duct 62 is vent duct 65 with its valve 66 in its closed state indicated by the two parallel vertical lines 67 and vent duct extension 65E whose proximal end 65P is illustrated in sectional views. For convenience and clarity of disclosure herein the term "proximal" shall refer to portions of components generally in the left portion or remote from duct segment 62 in FIG. 7, and the designation "distal" shall refer to portions of components closer to or in the direction of duct segment 62. Proximal and distal is also the direction of insertion of the IVT and of gas flow to inflate the balloon. For further clarification as seen in FIG. 7, vent duct 65 comprises distal portion, proximal portion 65P, with valve 66 traversing vent duct 65.

This IVT includes an outer tube 71 having proximal end 71P and a distal end 71D, and inner tube 73 slidable within said outer tube, the inner tube having proximal and portion 73P and distal end portion 71D which includes un-inflated but inflatable balloon 74. New balloon deflection device 80 whose details are more clearly illustrated in FIGS. 8A and 8B.

FIG. 8A shows more clearly vent duct 65 extending transversely from and in fluid communication with duct segment 62, vent duct 62 having its extension 65E extending in the proximal direction. In this figure outer tube 71 is shown with its distal portion extending through valve 65 which has been opened to allow insertion of said outer tube 71.

Within outer tube 71 is shown inner tube 73 with balloon deflection device 80-illustrated in one of many possible configurations. As shown in this figure balloon 74 has a collar portion 74P secured onto the distal and 71D of the inner tube 71 balloon 59 being illustrated in its un-inflated state, which is prior to its being pushed in the distal direction into the open area or zone 60Z in the bore of duct 60.

The deflection device 80 of IVT 60 in this configuration consists of collar 81 whose proximal end 81P slides onto the distal end of the inner tube 73, with a distally extending portion of collar 81 engagable to the proximal end of balloon 74. The un-inflated balloon is pushed by the deflection device 80 into the zone 60Z where the balloon is inflated.

In this embodiment collar 81 has finger portion 82 that is spring biased to deflect downward as illustrated in FIG. 8 to push balloon 74 in the direction of the valve being blocked. In this embodiment device 80 includes hinge portion 83 between collar 81 and finger 82 to push and deflect the balloon to a position inclined from the axis of vent duct 65 from where it was transported. Numerous alternative constructions or techniques are possible to achieve this biasing effect, which may or may not include a hinge area, such as forming the collar to be less stiff or weaker or softer or thinner on the side wall where deflection is desired, so that upon inflation the balloon naturally inclines in the direction for the weaker balloon material and toward the valve being blocked. The features achieved with this deflection device are having a construction small enough to be transported by within the isolation valve tool device and having a construction that automatically deflects the balloon upon introduction into the zone where it is to be inflated.

FIGS. 7 and 8A illustrate a further improvement of a gas-sealing cover 90 in combination with a proximally extending duct 65E from the proximal side of vent valve 66 to prevent gas leakage via the opened vent duct valve while it is open to allow insertion of the isolation valve tool. The cover's distal end is formed as a sleeve encompassing or encircling the proximal end 65E of the vent duct and secured there with one or more belts 91, 92 or bands, straps or other securing means. The proximal end of cover 90 is sealingly engaged to the proximal area of inner tube 73. When valve 65 s open and gas leakage from the main duct 61 through said valve and into, through and/or around the outer tube, is captured within the cover. In an alternate version the proximal end of the over may engage the proximal part of the inner tube in a sealing but slidable coupling instead of being fixed thereon.

As seen in FIG. 8B, in operation of this device, after inner tube 73 transports the un-inflated balloon to zone 61Z, inflation of balloon 74 occurs by opening valve 95 which allows flow of pressurized air or other gas from source 96. While the balloon is inflated and blocking further gas leakage the downstream valve 97 can be removed, repaired and/or replaced. In practice, upon removal of the downstream valve, the opening is securely capped so as to no rely on the balloon alone to block leakage while this section of duct of off-stream. Subsequently the process is reversed to remove the insertion tool and close vent duct valve 65. The sequence described above defines a method of temporarily sealing a leaking valve duct system while investigation and repair is done.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

LISTING OF FIGURE NUMBERS

59 gas duct system
60 isolation valve tool IVT
60Z zone of gas leak
61 gas duct
62 duct segment
63 valve to be blocked
64 gas leaking from valve 63
65 vent duct
65E vent duct extension
65P proximal end of vent duct
66 vent duct valve
67 parallel lines of vent duct valve
71 outer tube
71P proximal end of outer tube
73 inner tube
73D distal end of inner tube
74 inflatable balloon
80 balloon deflection device
81 collar
81P proximal end of collar
81D distal end of collar
82 finger of deflection device
83 hinge
90 sealing cover
91, 92 belts, straps
93 proximal end seal for cover
95 valve
96 source of compressed gas

The invention claimed is:
1. In a gas flow duct system which includes
   (a) a gas flow duct with a central bore,
   (b) a valve in said gas flow duct to be blocked from gas leakage therefrom,
   (c) a permanent vent duct which has proximal and opposite distal ends, said distal end in permanent intersecting and fluid communication with the central bore of said gas flow duct,
   (d) a vent duct valve in said permanent vent duct having open and dosed states, and
   (e) a source of compressed gas and a compressed gas valve to selectively allow flow of said gas, the improvement of a valve isolation tool to block leakage gas flow through said valve to be blocked,
   said valve isolation tool comprising:
      (1) an outer tube having proximal and distal ends,
      (2) an inner tube having proximal and distal ends and movable axially within said outer tube, said proximal end fluid coupled to said source of compressed gas,

(3) an inflatable balloon attached to said distal end of said inner tube and inflatable with gas flowed from said source of compressed gas, and (4) a balloon deflection device having a first part secured to said inner tube, and a second part that extends distally from said first part to lie adjacent said balloon, said device being spring biased to bend in a predetermined inclination from the axis of said inner tube to deflect said balloon after said balloon is transported through said outer tube and into the bore of said gas duct, wherein said isolation tool is insertable through said permanent vent duct valve when said valve is in its open state, and thence through said the vent duct to said gas flow duct, and said inner tube is axially movable through said outer tube until said balloon is situated within said gas flow duct where said balloon is inflatable and said second part of said balloon deflection device deflects said balloon in said predetermined direction toward the valve to be blocked.

2. In a gas flow duct system which includes
(a) a gas flow duct with a central bore,
(b) a valve in said gas flow duct to be blocked from gas leakage therefrom,
(c) a permanent vent duct which has proximal and opposite distal ends, said distal end in permanent intersecting and in fluid communication with the central bore of said gas flow duct,
(d) a vent duct valve in said permanent vent duct having open and closed states, and
(e) a source of compressed gas and a compressed gas valve to selectively allow flow of said gas, the improvement of a valve isolation tool to block leakage gas flow through said valve to be blocked,
said valve isolation tool comprising:
(1) an outer tube having proximal and distal ends,
(2) an inner tube having proximal and distal ends and movable axially within said outer tube, said proximal end fluid coupled to said source of compressed gas,
(3) an inflatable balloon attached to said distal end of said inner tube and inflatable with gas flowed from said source of compressed gas, and
(4) a balloon deflection device having a first part secured to said inner tube, and a second part that extends distally from said first part to lie adjacent said balloon, said device being spring biased to bend in a predetermined inclination from the axis of said inner tube to deflect said balloon after said balloon is transported through said outer tube and into the bore of said gas duct,
wherein said isolation tool is insertable through said permanent vent duct valve when said valve is in its open state, and thence through said the vent duct to said gas flow duct, and said inner tube is axially movable through said outer tube until said balloon is situated within said gas flow duct where said balloon is inflatable and said second part of said balloon deflection device deflects said balloon in said predetermined direction toward the valve to be blocked, and wherein said vent duct has a proximal part extending proximally from said vent duct valve and generally axially with said vent duct, said valve isolation tool further comprising a flexible cover having a proximal end securely disposed airtight about the proximal end of the inner tube, and a distal end of securely disposed airtight about said duct segment so that said cover encompasses said outer tube extending proximally of said distal portion of said vent duct and a proximal part of said inner tube.

3. The valve isolation tool of claim 2 wherein the balloon deflection device first part comprises a collar generally surrounding said distal end of said inner tube.

4. The valve isolation tool of claim 3, wherein said second part of said balloon deflection device comprises a finger extending generally axially and distally from said collar.

5. The valve isolation tool of claim 2, wherein the balloon is inflatable to a size corresponding to an interior surface of the gas flow duct to thereby prevent the flow of gasses past the inflated balloon.

6. In a gas flow duct system which includes (a) a gas flow duct with a central bore, (b) a valve in said gas flow duct to be blocked from gas leakage therefrom, (c) a vent duct which has proximal and opposite distal ends, said distal end intersecting and being in fluid communication with the central bore of said duct, (d) a vent duct valve in said vent duct having open and closed states, and (e) a source of compressed gas and a compressed gas valve to selectively allow flow of said gas, the improvement of a valve isolation tool to block leakage gas flow through said valve to be blocked,
said valve isolation tool comprising:
(1) an outer tube having proximal and distal ends,
(2) an inner tube having proximal and distal ends and movable axially within said outer tube, said proximal end fluid coupled to said source of compressed gas,
(3) an inflatable balloon attached to said distal end of said inner tube and inflatable with gas flowed from said source of compressed gas, and
(4) a flexible cover having proximal and distal ends, the proximal end of the flexible cover being securely disposed airtight about a proximal portion of the inner tube, and the distal end of the flexible cover being securely disposed airtight about said proximal end of said vent duct segment.

7. The valve isolation tool of claim 6, wherein the flexible cover is an elongated elastic hood.

8. The valve isolation tool according to claim 6 further comprising at least one belt encompassing the distal end of said cover where it engages and overlies said proximal end of said vent duct segment.

9. The valve isolation tool according to claim 8 where said cover is air impervious.

10. A method in a gas flow duct system operable with a source of compressed gas, for blocking gas flow leakage through a blocked valve in a gas flow duct that has a duct segment downstream of said blocked valve and a vent duct having proximal and distal ends, said distal end in fluid communication with the bore of said duct segment through an opening in the wall of said duct segment, said vent duct including an on/off valve intermediate its ends, comprising the steps of:
(a) providing a tubular isolation tool which includes an outer tube having proximal and distal ends, an inner tube having proximal and distal ends and axially movable within said outer tube, and an inflatable balloon attached to said distal end of said inner tube;
(b) providing a flexible tubular cover having proximal and distal ends, wherein the proximal end of the flexible cover is securely disposed airtight about the proximal end of the inner tube, and the distal end of the flexible cover is securely disposed airtight about the junction where the inflation tool enters the vent duct, (c) inserting said distal ends of the outer and inner tubes of said valve isolation tool through said on/off valve and thence through said vent tube until said un-inflated balloon is extended into said bore of said duct segment; and (d) inflating said balloon from said high pressure source of gas until the balloon fills said bore of said duct segment and blocks gas flow leakage in said duct segment.

11. The method of claim 10, wherein the step (c) comprises first inserting the distal end of the outer tube through said vent duct and opened blocking valve, and then slidably inserting the distal end of the inner tube coaxially within the outer tube which extends through said further blocking valve, until the deflated balloon passes into the bore of said duct segment.

12. The method of claim 10 further comprising inspecting, repairing and/or replacing a relief valve located along the downstream segment of the gas flow duct system.

13. The method of claim 12 further comprising deflating and removing said balloon from said duct segment of said gas flow duct system.

* * * * *